3,287,091
DEVICE FOR CARRYING OUT A CHEMICAL
REACTION
Patrick Nollet, La Celle-Saint-Cloud, and Pierre Sarrat and Roland Vuillemey, Grenoble, France, assignors to Commissariat a l'Energie Atomique, Paris, France
Filed Apr. 18, 1963, Ser. No. 274,032
Claims priority, application France, Apr. 21, 1962, 895,322
2 Claims. (Cl. 23—285)

The present invention has for its object the construction of a device intended to carry out as a continuous process a chemical reaction between a liquid phase and a gaseous phase, and a method of preparation of ammonium diuranate which is carried into effect in said device.

The achievement of chemical reactions in a liquid phase between at least one constituent of said phase and a gaseous fluid is a common problem which can usually be solved in a satisfactory manner by different means. The same applies to the problem of physical or chemical absorption, whether total or partial, of a gaseous fluid by a liquid phase (dissolving).

In certain cases, however, and above all when a continuous process is contemplated, it is an advantage to provide a gas flow which is as constant as possible; compliance with this condition is more especially necessary when, in addition, the introduction of the gaseous fluid in the midst of the liquid results in the formation of a precipitate and/or an exothermic reaction which is liable to produce obstructions or variations in pressure especially in the downstream portion of the conduit through which said gaseous fluid is supplied, all the more so as the cross-sectional area of said conduit is smaller.

It is also frequently preferable if not essential, for economic reasons and/or safety reasons, to avoid any loss of gaseous fluid (resulting from the conditions of introduction of said fluid in the liquid).

Accordingly, in the case of the manufacture of ammonium diuranate by introduction of gaseous uranium hexafluoride in the midst of an aqueous ammoniacal solution, it is essential to limit as far as possible any rejection of uranium hexafluoride by the solution, especially on account of the toxicity and the corrosive character of this substance.

It should additionally be pointed out that, in the case of manufacture of ammonium diuranate, the equipment employed must have characteristics, particularly of a geometrical order, which are such as to ensure that in the case of uranium which is strongly enriched in $U^{235}$, the criteria of criticality are respected.

The present invention has for its object the construction of an apparatus designed to carry out in continuous operation a chemical reaction between a liquid phase and a gaseous phase which satisfy the conditions as hereinabove set forth, and a method of preparation of ammonium diuranate which is carried into effect in said apparatus.

The apparatus in accordance with the invention is characterized in that it comprises a sonic venturi-tube injector, the downstream end of which is immersed in said liquid phase and means for supplying said injector with gaseous phase under a substantially constant upstream pressure.

The flow rate of the gaseous phase can advantageously be maintained constant, while also maintaining constant the pressure and temperature upstream of the sonic venturi throat of the injector.

The total gas flow in a sonic venturi-tube is in fact given by the Formula (1) below, provided, however, that the relation (2) below is complied with:

(1)
$$q = PoAc \frac{F(\gamma)}{\sqrt{\frac{R}{M}Ts}} \times \sqrt{\frac{Ts}{T}}$$

(2)
$$\frac{Pc}{Po} = \left(\frac{2}{\gamma+1}\right)^{\frac{\gamma}{\gamma-1}}$$

in which:
$q$ is the total gas flow
$Po$ is the pressure on the upstream side of the sonic venturi throat
$\gamma$ is the ratio of specific heat at constant pressure to the specific heat at constant volume of said gas
$F(\gamma)$ is the function $$\sqrt{\gamma}\left(\frac{2}{\gamma+1}\right)^{\frac{\gamma+1}{2(\gamma-1)}}$$

R is the universal constant of ideal gases
M is the molecular weight of the gas considered
$Ts$ is the standard reference temperature in degrees Kelvin
$T$ is the temperature of the gas stream on the upstream side of the venturi throat in degrees Kelvin
$Pc$ is the pressure within the venturi throat
$Ac$ is the cross-sectional area of the venturi throat This formula shows that for a given cross-sectional area of the throat ($Ac$ constant) and a constant temperature of the gas stream on the upstream side of the throat, the total gas flow is proportional to the pressure $Po$.

If necessary, the said total gas flow can be modified exactly as desired by maintaining constant the temperature $T$ and by producing a controlled variation of the pressure $Po$. It should be noted that the fluctuations of pressure on the downstream side of the zone of introduction of the gaseous phase do not entail any modification of the flow rate of said phase.

It is possible to inject the gaseous phase to any depth in the liquid phase, and by this means to prevent the bubbles of the gaseous phase, when said bubbles do not contain any constituent which is not likely to disappear into the liquid phase, from reaching the free surface of the liquid; this possibility can additionally serve to prevent the gas bubbles, when said bubbles initially contain at least one such constituent, from reaching the free surface of the liquid while still containing at least one constituent which is capable of disappearing into the liquid phase; in fact, the greater the depth of injection, the longer the gas bubbles remain in the liquid phase, with the result that all the constituent which is able to react with said liquid phase is thus effectively permitted to react.

In the case of the preparation of ammonium diuranate starting from uranium hexafluoride, the abovementioned possibility constitutes a particularly appreciable safety measure.

Accordingly, the preparation of ammonium diuranate as carried out in the device in accordance with the invention will be advantageously performed under the following conditions:

depth of immersion of the downstream end of the injector: at least 15 cms.,
temperature on the upstream side of the sonic venturi throat: varying between 200° C. and 250° C.,
pressure on the upstream side of the sonic venturi throat: at least 2 kgs./cm.²,
diameter of the sonic venturi throat: at least equal to 0.2 mm.,
use of pure uranium hexafluoride, aqueous ammoniacal solution having a concentration ranging between 1 N and 12 N.

It has been shown that the characteristics of the ammonium diuranate obtained in accordance with the invention, and especially the purity, particle-size distribution and overall yield in uranium precipitate were fairly closely dependent on a large number of parameters, among which it is especially useful to mention:

(a) Quantity of ammonia employed compared with ammonium hexafluoride (the process is preferably carried out with an excess quantity of ammonia).

(b) The treatment time of the ammonium diuranate precipitate in the aqueous ammoniacal solution.

(c) The manner in which the ammonia is introduced: concentration(s) of the ammoniacal solution or solutions, and if necessary the points and moments of introduction of said ammoniacal solutions.

Let $n$ be the ratio:

$$\frac{NH_3 \text{ molecules employed}}{UF_6 \text{ molecules}}$$

I. Influence of the total quantity of ammonia employed (a) *On the overall yield.*—It is assumed in this case that a partial precipitation is carried out with a 2 N ammoniacal solution in a first precipitator and in which said precipitation is pursued with a 10 N ammoniacal solution in a second precipitator in series with the first: it is found that, when $n$ increases from 0.81 to 8.14, the uranium content of the mother-liquors which pass out of the second precipitator drops from 2130 mg./l. to 2.7 mg./l.; the value $n$ is preferably chosen in the vicinity of 8.

(b) *On the physical characteristics of ammonium diuranate.*—It is assumed in this case that a single precipitator is employed; in order to obtain a suitable yield, it is essential to ensure that $n$ should be at least equal to 2; it is observed that, when $n$ is increased from 2.3 to 6.8, the sedimentation rate, the filtration rate, the water content of the diuranate cake and the percentage by weight of particles having a diameter larger than 1.6 mm. change respectively from 2.55 m./h., 4 m.$^3$/h.$\times$m.$^2$, 29% and 65% to 1.1 m./h., 0.5 m.$^3$/h.$\times$m.$^2$, 49.5% and 90%.

II. Influence of a precipitation in several stages (a) *On the physical characteristics of ammonium diuranate.*—In this case, the condition of operation is that of I(a) above.

In the first place, the total quantity of ammonia introduced is assumed to be constant; let $n_1$ be the ratio of the number of molecules of $NH_3$ employed in the first precipitator to the number of molecules of $UF_6$ and let $n_2$ be the ratio of the number of molecules of $NH_3$ employed in the second precipitator to the number of molecules of $UF_6$; we therefore have in this case $n_1+n_2=$ constant.

When $n_1$ increases, the sedimentation rate decreases, the filtration rate remains correct (higher than approximately 7 m.$^3$/h.$\times$m.$^2$ in respect of $n_1(\gamma 3)$, the water content of the diuranate cake rapidly increases and similarly, the percentage by weight of the coarse grains rapidly increases also.

It will be assumed in the second place that $n_1$ remains stationary and that $n_2$ increases: the physical characteristics of the ammonium diuranate are then scarcely modified.

(b) *On the overall yield.*—Practically no influence.

III. Influence of the treatment time

This factor is not of primary importance either as regards the physical characteristics of ammonium diuranate as regards the overall yield. However, the filtration rate does increase with the treatment time. Accordingly, in the case $Ia$ above, for a treatment time of forty-six minutes in the first precipitator and nineteen minutes in the second precipitator (rate of feed of $UF_6$: 435 g./hour) the filtration rate is 8.5 m.$^3$/hour$\times$m.$^2$, whereas this rate falls to as little as 5.3 m.$^3$/hour$\times$m.$^2$ for treatment times respectively of twenty-four minutes and ten minutes in the precipitators (rate of feed of $UF_6$: 8.30 g./h.).

The most effective results can be obtained in the general case by working with a total quantity of $NH_3$ equal to at least twice as much as the theoretical quantity, with a time of treatment of the precipitate of the order of at least thirty-five minutes.

Even more favorable conditions consist in a precipitation which is carried out in two stages, first of all by making use of an ammoniacal solution having a concentration which ranges between 1.8 N and 2.2 N, then by employing an ammoniacal solution having a concentration ranging between 8 N and 12 N.

The temperature is preferably maintained between 50 and 75° C. in each precipitator.

The requisite particle size can be either that of a "powder" or that of an "agglomerate" according to the applications which are contemplated.

In the case of the manufacture of uranium dioxide in which a "powder" is required, the parameters of the precipitation process are preferably so determined that 95% of the agregate is formed of particles having a size which is smaller than 75$\gamma$.

In the case of the manufacturing of $UF_4$ which can serve for the production of uranium metal and in which "agglomerates" are desired, these parameters are regulated so that at least 80% of the aggregate is constituted by said agglomerates having sizes greater than 1.6 mm. (the fines fraction constituting a maximum of 20% are in any case essentially composed of fragmentation powder).

The appparatus in accordance with the invention is constituted by an injector which comprises in combination:

(a) a central cylindrical body of a first section, a sonic venturi-tube element joined at the downstream end to the first section, followed by a second section which is joined at the downstream end to said sonic venturi-tube element, (b) electric heating means for the purpose of heating each of said sections of said body, (c) at least at the level of said second section, an outer cylindrical casing which is heat-insulated from the central body.

The heating is preferably carried out by electric resistance.

The outer casing is preferably centered on the central body by means of a minimum number of discs so as to reduce to a minimum the conductivity losses from said central body to said outer casing.

The admission of the gaseous phase is carried out through the first section at the extremity opposite to the sonic venturi by means of a union which is adapted to said extremity.

A precipitator which is suitable for use in conformity with the method of the invention comprises a vertical cylindrical chamber, an inner tube which is coaxial with said chamber, and having on the one hand a flared lower extremity which has its opening above a feed distributor located in the bottom of said chamber and connected to a liquid-supply conduit and, on the other hand, lateral ports in the top portion of said inner tube, an inlet in the annular space formed between said chamber and said inner tube and opening beneath said ports and above the lower extremity of said inner tube, an overflow outlet disposed above said ports, and a rotary stirrer disposed inside the flared end of said inner tube.

A precipitator of this type offers the following features:

(a) The distribution of the grains of pricipitate in the liquid is made as uniform as possible, thereby avoiding any risk of a deposit being formed at the bottom of the precipitator or consequently any risk of clogging of the feed distributor which has been mentioned above.

(b) The finest grains are recycled in the bottom zone of the precipitator at the level of the flared end of the inner tube, whereas the coarsest grains can be removed through the overflow outlet, the separation process taking place in the above-mentioned annular space at the level of the ports of the inner tube and in the midst of the suspension which is delivered through said ports; this recycling process has the effect of swelling the grains.

A precipitator of this type can be fitted in accordance with the invention with an injector comprising a sonic venturi, the downstream end of which accordingly affords admission into the annular space between the inner tube and the lateral wall of the precipitator. The said precipitator can accordingly constitute the first precipitator in the two-stage precipitation of ammonium diuranate, whilst a precipitator such as that which has been described in the foregoing but not equipped with a sonic-venturi injector can constitute the second precipitator of this process.

It is preferable to ensure that the injector of the said first precipitator is disposed in parallel relation to said inner tube with the downstream end directed downwards.

This arrangement of the injection system permits the entrainment of all the bubbles in a downward direction and the division thereof at the level of the rotary stirrer.

Reference being made to the diagrammatic FIGURES 1 to 3 of the accompanying drawings, there will now be described below various examples of practical application of the method and apparatus which make it possible to carry out in continuous operation a chemical reaction between a liquid phase and a gaseous phase, said method and said apparatus being applicable especially to the manufacture of ammonium diuranate as contemplated by the present invention.

The constructional arrangements which will be described in connection with these examples must be considered as forming part of this invention, it being understood that any and all equivalent arrangements can equally well be employed without thereby departing from the scope of said invention.

Figure 1:
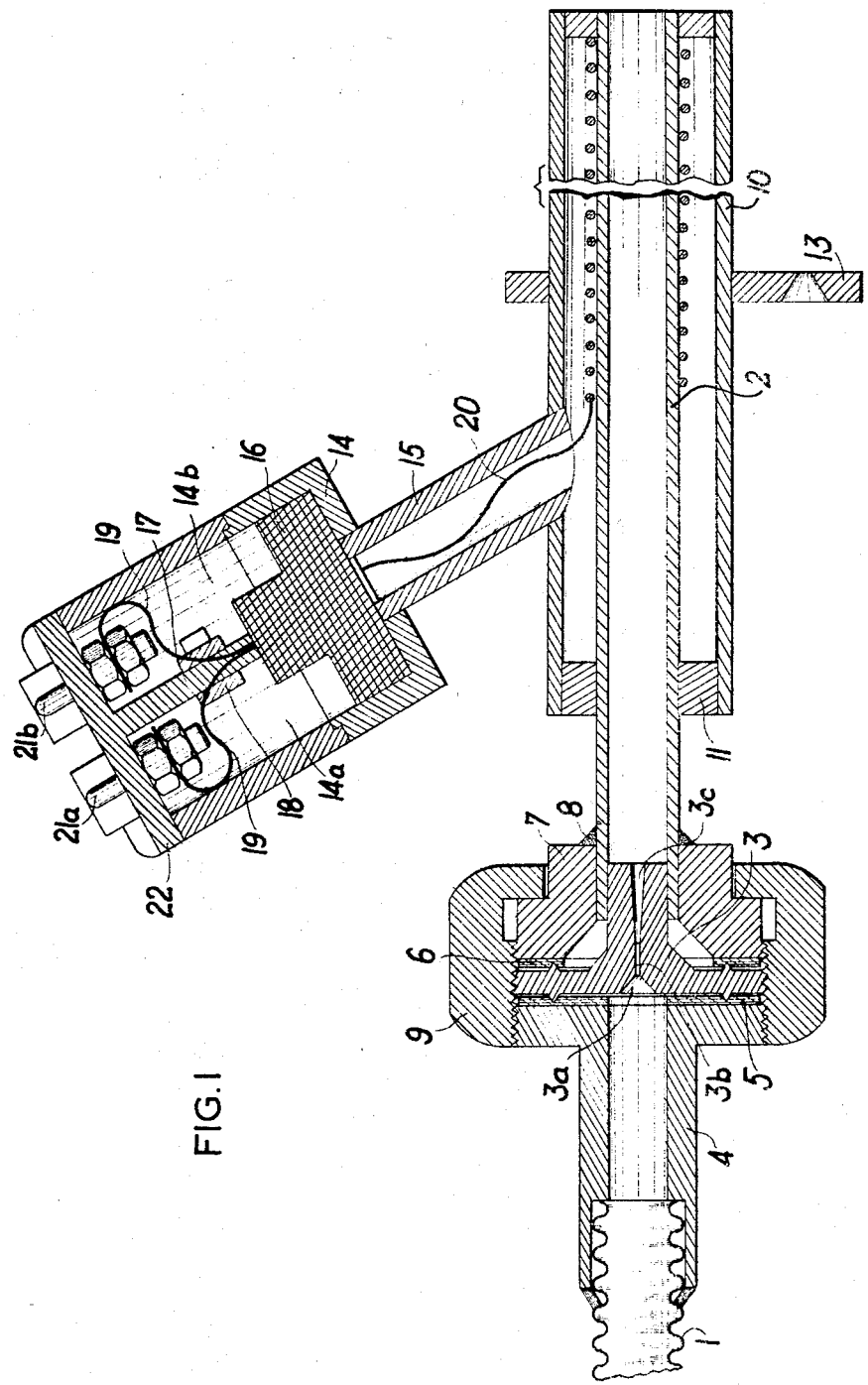
FIG. 1 is a longitudinal sectional view of an injector in accordance with the invention.

FIGURE 1 shows the first central body section which is constituted by a flexible pipe 1, the second central body section which is constituted by a cylindrical tube 2 of Monel metal having an external diameter of seven millimeters and a length of two hundred and twenty-five millimeters, and the venturi tube 3 comprising a combining cone 3a (half angle at the center: 45°), a throat 3b (cylindrical opening of 0.5 mm. diameter and 1 mm. in length) and a delivery cone 3c (half angle at the summit: 7°).

The flexible pipe 1 is connected to the venturi 3 by means of the connector 4 (silver-soldered onto the flexible pipe 1) with interposition of the sealing joint 5 of polytetrafluoro-ethylene; the cylindrical tube 2 is fitted with slight friction over said venturi tube, fluid-tightness being ensured by means of the sealing joint 6 of polytetrafluoro-ethylene; the end of the cylindrical tube 2 is fitted inside the connector 7 and is welded thereto at 8; the combined assembly of parts 4, 5, 3, 6 and 7 is clamped together by means of the nut 9.

The cylindrical tube 2 is centered in the outer casing which is constituted by a cylindrical tube 10 of stainless steel having an external diameter of eighteen millimeters; the centering is effected by means of the discs 11 and 12 of stainless steel; the said discs are welded onto the tube 10 and silver-soldered on the tube 2.

The mounting plate 13 is welded to the tube 10; the position of said plate is determined by taking into account the depth of immersion at which it is found necessary to set the downstream end of the injector. The means for heating the cylindrical tube 2 are constituted by a junction box 14 which is connected to a tube 10 by means of an oblique tube 15 welded at each end; said junction box is divided into two compartments 14a and 14b which are both heat-insulated and electrically insulated by means of the block 16 and the partition 17 to which are attached by means of a double cradle 18 the cable sheating 19 of the two lengths of electric resistance heating wire. This wire 20 is of "thermocoax" (wire made of nickel-chrome alloy coated with magnesium silicate and provided with an external cladding of Monel metal or Inconel) and has an external diameter of 1 mm.; the two shrouded male plugs 21a and 21b are fixed on a plate 22 of polytetrafluoro-ethylene and connected to the leads brought out from the double cradle 18; the total power is of the order of 500 watts, while the length of winding of the wire 20 is four hundred and ninety millimeters (up to the downstream end of the injector).

The means for heating the flexible pipe 1 (which have not been illustrated in the drawings) essentially comprise a thermocoax wire which is wound around said pipe, the assembly being then covered with heat-insulating material; the total power of this element is 1500 watts and can be modified by means of a regulator which is controlled in dependence on the indications of a thermocouple, the welded junction of which is located in the interior of said pipe immediately upstream of the venturi-tube element 3.

Figure 2:
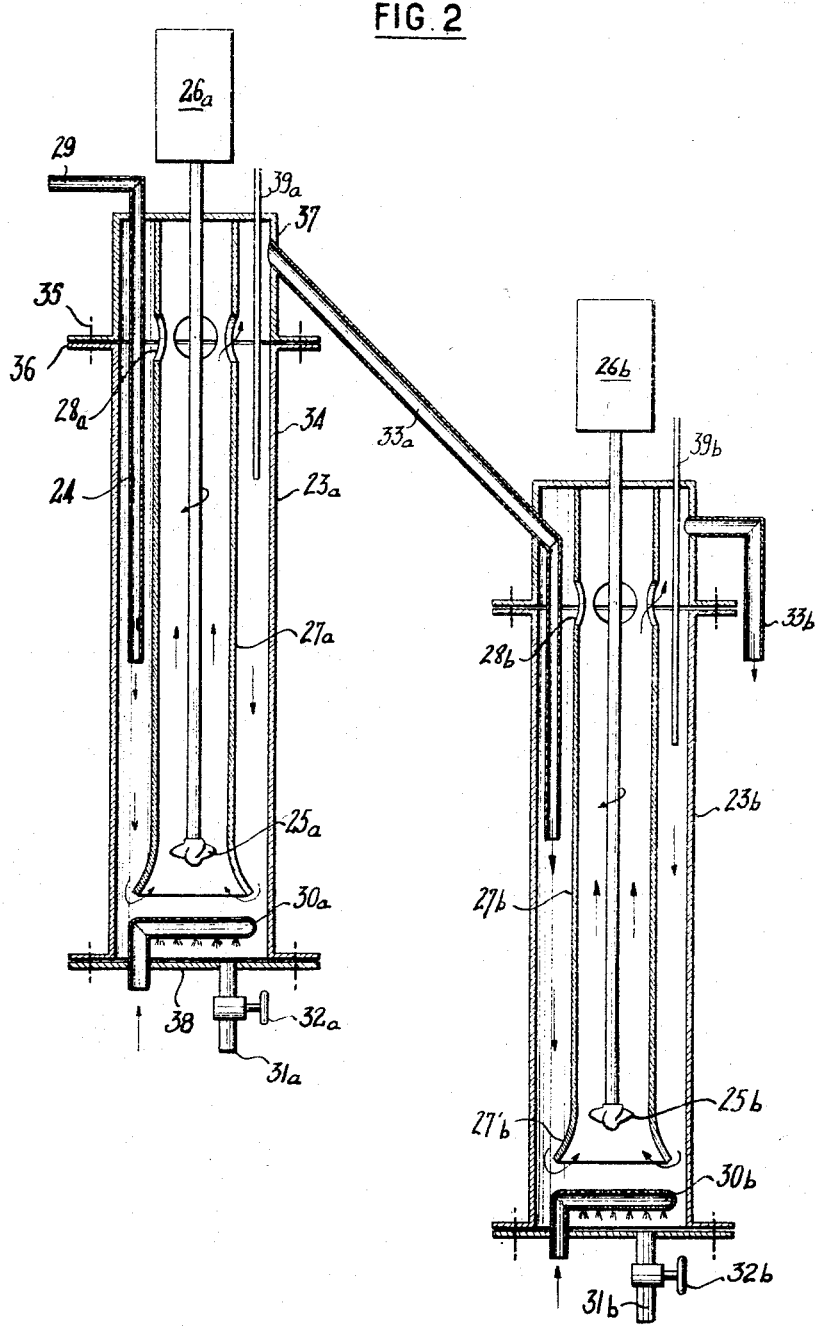
FIG. 2 is a diagrammatic view of two precipitators in series for the manufacture of ammonium diuranate in accordance with the invention.

FIG. 2 shows the first precipitator 23a, inside which is disposed the sonic venturi-tube injector 24, the second precipitator 23b, the stirrers 25a and 25b which are driven respectively by the motors 26a and 26b, the central tubes 27a and 27b in which are formed lateral ports such as the ports 28a and 28b, the inlet pipe 29 for the admission of gaseous fluid ($UF_6$) which supplies the feed distributor 30a which supplies 2 N ammoniacal solution, the feed distributor 30b which supplies 10 N ammoniacal solution, the evacuation pipes 31a and 31b with their control valves respectively designated by the reference numerals 32a and 32b, the overflow pipe 33a which is used for the purpose of conveying to the second precipitator the suspension which passes out of the first precipitator and the exit pipe 33b for the aqueous ammoniacal suspension of ammonium diuranate.

The direction of flow of the fluid (gaseous phase and liquid phase) is shown by the arrows; the stirrers are constituted by blade-screws 25 of great pitch which are placed at the center of the flared portions 27′ of the tubes 27; the shape of the flared portions and the velocities employed permit of a definite recycling of the solutions in the annular zones formed between each tube 27 and the precipitator wall and determines the treatment time; the injection of $UF_6$ in the first precipitator is carried out in the recycled fraction of the liquid phase (which passes out through the ports 28 and flows downwards through the annular zones referred-to above) at a level such that the gaseous phase which is injected into said downflowing liquid fraction is sucked up through the flared portion of the central tube and suitably homogenized in the vicinity of the injection of the ammoniacal solution; the feed distributors 30 which supply the ammoniacal solutions are of the ring type with multiple holes, thereby permitting a uniform distribution at the level of the stirrer blades.

The chamber which defines each of the two precipitators 23a and 23b is of Pyrex glass and comprises a central body 34 and, added on said body by means of bolts such as the bolt 35 fitted in flanges such as the flange 36, a cover 37 to which are secured the central tube 27a, the motor 26a, (and the injector-tube 24 for the precipitator 23a) and a bottom 36.

The thermocouples 39a and 39b permit the control and regulation of the temperature at which the precipitation is carried out.

Figure 3:
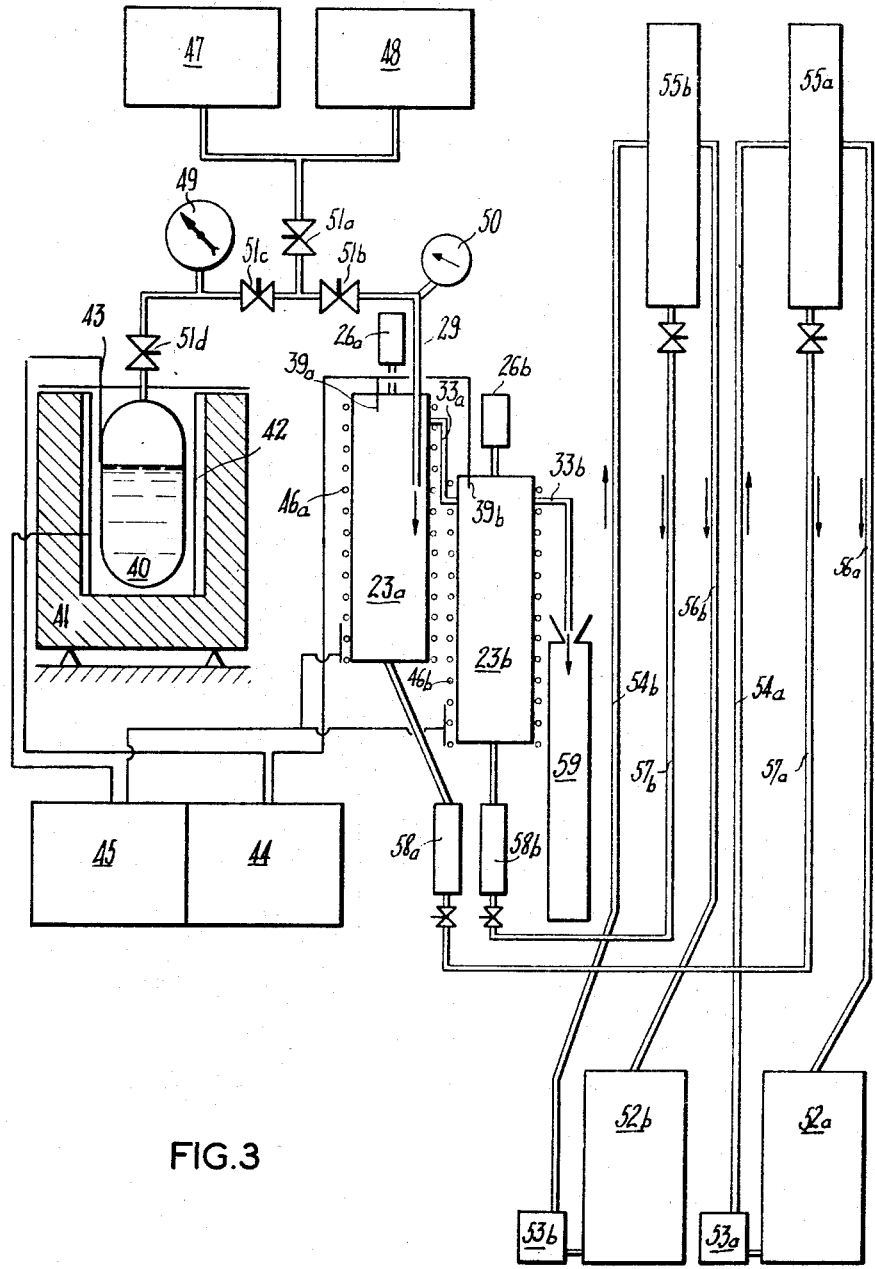
FIG. 3 is a diagrammatic view of a complete installation for the manufacture of ammonium diuranate in accordance with the method of the invention and by means of the corresponding equipment.

There are again shown in FIG. 3 the precipitators 23a and 23b and the elements which have been described in connection with FIG. 2. There can additionally be seen in this figure:

The cylindrical vessel 40 which contains $UF_6$; said vessel is located inside a heat-insulated enclosure 41 which is heated by means of a set of four infra-red heating tubes 42 which provide a range of temperatures between 60° C. and 150° C. to within 1° C.; the temperature given by the thermocouple 43 which is fixed on the wall of the vessel 40 is recorded at 44 and a regulator 45 regulates the heating (zero, two or four infra-red tubes in service); it is thus possible to obtain a well-defined vapor pressure, and consequently a well-defined pressure upstream of the injector tube 24 as set, for example, at ±50 g./cm.²; the heating means 46a and 46b of the precipitators 23a and 23b; the temperature of each of these two precipitators can be maintained constant to within 5° C. by means of thermocouples 39a and 39b which transmit their indications to the recording device 44 which is connected to the regulator 45 which in turn produces action on the heating means.

The device 47 for purifying (by means of nitrogen) the piping of the downstream portion of the installation, the device 48 for vacuum degassing of the upstream portion of the installation (which further comprises cold traps for $UF_6$), the pressure gauges 49 and 50 and the valves 51a, 51b, 51c and 51d.

The tanks 52a and 52b for the storage of aqueous ammoniacal solution (concentration 2 N and 10 N respectively), the lifting pumps 53a and 53b, the pipes 54a and 54b through which the lifting is effected, the constant-level tanks 55a and 55b (with their overflow pipes 56a and 56b) and the conduits 57a and 57b through which said ammoniacal solutions are supplied to the feed distributors 30a and 30b (as shown in FIG. 2) of the precipitators 23a and 23b; in these conduits are mounted flow meters 58a and 58b.

The device 59 for the filtration of the aqueous ammoniacal suspension of ammonium diuranate which flows through the pipe 33b.

Ammonium diuranate having the following characteristics particle size distribution ("powder"): particle sizes smaller than $71\mu$=95%; from $71\mu$ to $160\mu$=1%; from $160\mu$ to $315\mu$=1%; $315\mu$ to $500\mu$=0.4%; $500\mu$ to $750\mu$=1.2%; larger than $750\mu$=0%
water content=20.7%
uranium content=73.3%
fluorine content=2.5%
rate of filtration at 20° C.=9.8 m.³/h.×m².
rate of sedimentation at 20° C.=4.2 m./h.
unit area: of the order of 1.5 m.²/g.

thus making said ammonium diuranate particularly suitable for the preparation of sinterable $UO_2$, has been prepared by means of said equipment with the following operating characteristics:

yield of $UF_6$: 390 g./h.
yield of ammoniacal solutions:
　5.5 liters/hour of ammoniacal solution:
　　2.18 N($n_1$=1.55)
　5.48 liters/hour of ammoniacal solution:
　　9.5 N($n_2$=6.7)
pressure on upstream side of throat: 3 kgs./cm.²
temperature on upstream side of throat: 230° C.
temperature of regulation of $UF_6$ containing vessel=95° C.
diameter of throat=0.3 mm.
temperature in the first precipitator: 61° C.
temperature in the second precipitator: 60° C.
dissipated power rating in respect of the heating of the first precipitator: 400 watts
dissipated power rating in respect of the heating of the second precipitator: 250 watts
power ratings of the injector heating means are those given in connection with FIG. 1.

What we claim is:

1. A device for carrying out a continuous chemical reaction in a liquid phase between at least one constituent of said phase and a gaseous fluid, said device comprising a sonic venturi-tube injector, a down-stream end for said injector, said down-stream end being immersed in said liquid phase and means for supplying a gaseous phase to said injector at a substantially constant upstream pressure, a vertical cylindrical precipitator chamber, said injector being mounted within said chamber, an inner tube for said chamber coaxial with said chamber, a flared lower extremity for said tube, a feed distributor spaced from and beneath said flared extremity at the bottom of said chamber, a liquid supply conduit connected to said distributor, lateral ports in the top portion of said inner tube, an inlet from said injector in the annular space formed between said chamber and said inner tube and opening beneath said ports and above the lower extremity of said inner tube, an overflow outlet disposed above said ports in said chamber and a rotary stirrer disposed inside said flared end of said inner tube.

2. Device as described in claim 1 including second precipitator chambers connected in series ot said chamber.

References Cited by the Examiner

UNITED STATES PATENTS

| | | | |
|---|---|---|---|
| 1,480,324 | 1/1924 | Willson | 239—132 |
| 1,582,899 | 5/1926 | Cassidy | 261—77 |
| 1,740,441 | 12/1929 | Chogo | 261—77 |
| 1,808,956 | 6/1931 | Ketterer | 261—77 |
| 2,450,174 | 9/1948 | Weinrich et al. | 23—285 X |
| 2,466,118 | 5/1949 | Miller et al. | 23—14.5 |
| 2,953,430 | 9/1960 | Leaders et al. | 23—14.5 |
| 3,000,698 | 9/1961 | Crowe | 23—14.5 |

OTHER REFERENCES

Belle, Proceedings of the Second U.N. International Conference, Conference on the Peaceful Uses of Atomic Energy, Sept. 1–13, 1958, vol. 6, p. 569.

Wett et al., Chemical Processing, January 1957, pp. 82–86.

Nuclear Science Abstracts, vol. 17, No. 5, March 15, 1963, Abstract No. 5935; abstract of "Contribution to the Chemical and Technological Study of Ammonium Diuranate" by R. Vuillemey, 1962.

MORRIS O. WOLK, Primary Examiner.

CARL D. QUARFORTH, Examiner.

J. D. VOIGHT, J. H. TAYMAN, Assistant Examiners.